May 11, 1965

R. L. WATSON 3,183,012

CHUCK MOUNTING

Filed May 14, 1963

INVENTOR.
Roy L. Watson
BY John A. Hamilton
Attorney.

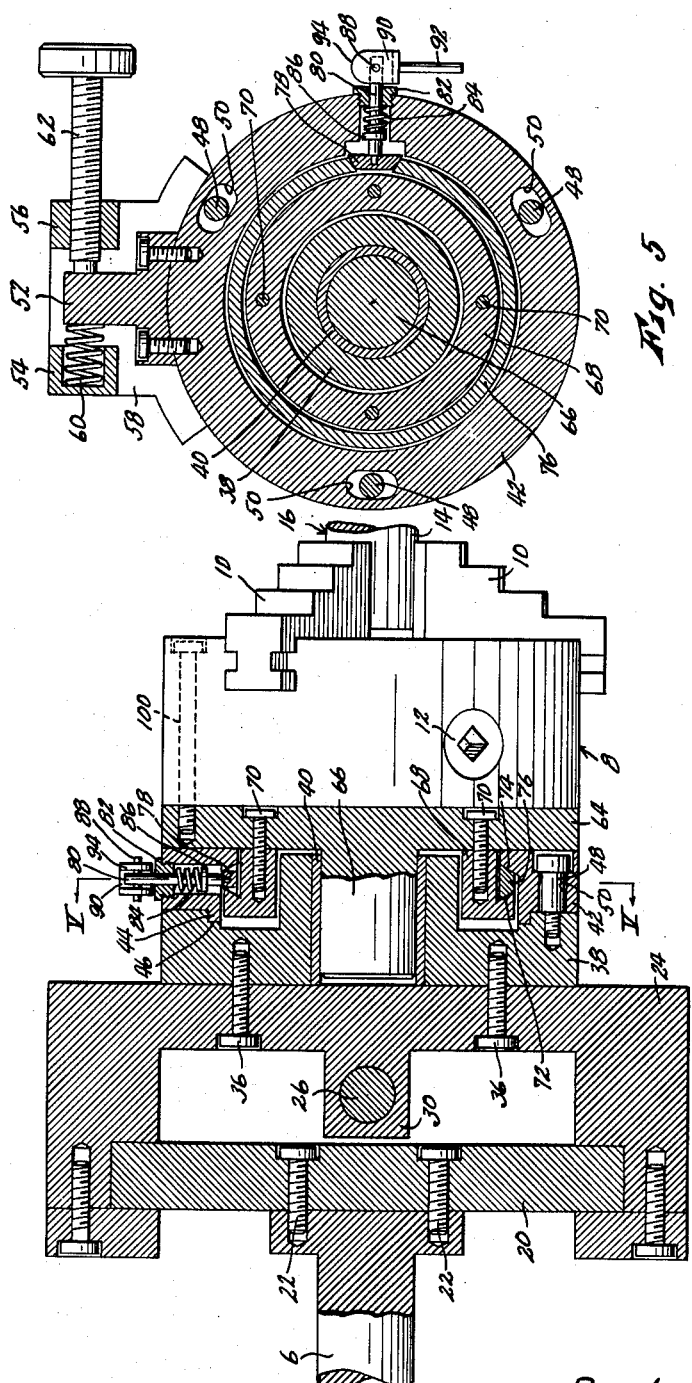

United States Patent Office

3,183,012
Patented May 11, 1965

3,183,012
CHUCK MOUNTING
Roy L. Watson, Shawnee Mission, Kans., assignor to Peterson Machine Tool, Inc., Merriam, Kans., a corporation of Missouri
Filed May 14, 1963, Ser. No. 280,376
5 Claims. (Cl. 279—6)

This invention relates to new and useful improvements in chuck mountings, and has particular reference to a mounting for a chuck adapted to support a crankshaft while performing various operations thereof.

When performing certain operations on a crankshaft, such as grinding the rod bearings thereof or applying weld metal thereto to compensate for wear, it is desirable that the shaft be supported in such a manner that each rod bearing may be rotated about its own axis, in order that the welding, grinding or other operations may be carried out expeditiously. When the crankshaft is supported between work-gripping chucks engaging the main bearings of the shaft, to which the rod bearings are of course eccentric, the chucks themselves should be mounted in such a manner that their work gripping axes are adjustably movable in a direction radial to its axis of rotation in order that the axis of a rod bearing may be made coaxial with said axis of rotation. Also, since the various rod bearings of a crankshaft are usually angularly offset from each other, the chuck should be mounted so as to be rotatably adjustable about its own work-gripping axis, so that any of the rod bearings may be moved into the axis of rotation as desired. The prime object of the present invention is the provision of a chuck mounting which will provide these adjustments rapidly, accurately and conveniently.

Another object is the provision of a chuck mounting of the character described in which is provided a double adjusting means for rotating the chuck about its work axis relative to its mounting. The first of these adjusting means may be released or clamped rapidly to permit free rotation of the chuck to its approximate desired position. The second adjusting means operates independently of the first and is screw-operated to provide very fine adjustment.

A further object is the provision of a chuck mounting of the character described in which all adjustments may be made without necessity of loosening the chuck jaws and moving the crankshaft with respect thereto. This operation, which is commonly followed in, for example, crankshaft grinding machines in making the final fine adjustments of the angular position of the crankshaft, is tedious, difficult, often inaccurate, and often results in damage to the finely machined bearing surfaces gripped in the chucks.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a fragmentary front elevational view of a crankshaft grinding machine including a chuck, a chuck mounting embodying the present invention, and a crankshaft gripped operatively therein, FIG. 2 is a sectional view taken on line II—II of FIG. 1, FIG. 3 is an enlarged fragmentary sectional view taken on line III—III of FIG. 2, with parts left in elevation, FIG. 4 is an enlarged fragmentary sectional view taken on line IV—IV of FIG. 1, with parts left in elevation, and FIG. 5 is a sectional view taken on line V—V of FIG. 4.

Like reference numerals apply to similar parts throughout the several views, and the numeral 2 applies to the frame of a crankshaft grinding machine, said frame being generally similar to that of a lathe, having at one end a headstock 4 in which is rotatably mounted a horizontal spindle 6 on which is to be mounted a work-gripping chuck 8. The spindle may be rotated by any suitable means, such as by a belt (not shown) engaging a sheave wheel 7 fixed thereon. The chuck is of a common type, having expandable jaws 10 adapted to be moved radially by a wrench (not shown) inserted in a fitting 12 in the side of the cylindrical body thereof. The operation and structure of this type of chuck is not pertinent to the present invention and is well known in the art, and is therefore not detailed herein. In the drawing, the chuck is shown in gripping engagement with one of the main end bearings 14 of a crankshaft 16 on which operations are to be performed, said crankshaft also of course having rod bearings 18 which are parallel to but radially offset from the main bearings. It will be understood that, while not shown, the main bearing at the opposite end of the crankshaft is gripped in a chuck similar to chuck 8, which in turn is carried by a tail spindle coaxial with spindle 6 and rotatably mounted in a tailstock carried by frame 2. The mounting means attaching each of the chucks to its supporting spindle, whereby the chuck may be both rotated about its work-gripping axis and also moved radially to its spindle to bring any one of the crankshaft rod bearings into coaxial relation with the spindles, forms the subject matter of the present invention. Although not shown, it will be understood that frame 2 may also carry a grinding wheel, welding gun or the like for performing some desired operation on the crankshaft bearings as said bearings are rotated.

The mounting of chuck 8 includes a carrier base 20 constituting a flat rectangular plate disposed at right angles to spindle 6 and fixedly secured thereto by screws 22. Slidably mounted on said carrier base, so as to be movable thereon in a direction radial to spindle 6, is a carrier 24. Said carrier is adjustably movable on its base by a screw 26 disposed radially of spindle 6, said screw being rotatably journalled in a lug 28 fixed to plate 20, and threaded in a lug 30 fixed to carrier 24. Screw 26 is provided at its outer end with a squared lug 32 for receiving a wrench to turn said screw. The carrier may be fixed at any desired adjustment relative to its base by a set screw 34 threaded in the carrier and engageable with an edge of base plate 24.

Fixed on carrier 24 by screws 36, with its axis parallel to spindle 6, is a circular chuck base 38, said chuck base being provided with a hollow bearing bushing 40 coaxial therewith. Said bushing is adapted to be moved into or out of coaxial relationship with spindle 6 by operation of screw 26. Mounted on the outer face of chuck base 38 so as to be rotatable coaxially therewith is a circular friction disc 42 having the form of an annular ring. Said friction disc has a lip 44 concentric with the axis thereof which is engaged rotatably in a socket 46 formed in base 38 concentrically with the axis thereof. Said friction disc is secured to base 38 by three shouldered screws 48 (see FIGS. 4 and 5) which are parallel to the axis of the axis of disc 42 and threaded into base 38. Said screws are spaced angularly around the edge portion of the friction disc, and extend through angularly elongated slots 50 thereof, whereby said disc has a limited rotation with respect to the base.

The friction disc may be adjustably rotated with respect to base 38 by means including an arm 52 affixed to the peripheral edge of disc 42 and extending radially therefrom. Said arm extends between a pair of bosses 54 and 56 integral with a bracket 58 affixed to the peripheral edge of base 38 and extending radially therefrom, said bosses being spaced apart in a plane at right angles to the base axis. Boss 54 constitutes a socket holding a compression spring 60, the opposite end of said spring bearing against arm 52 to bias it continuously in one direction. An adjusting screw 62 is threaded in boss 56 and engages the side of arm 52 opposite that engaged by spring 60. It will be obvious that by turning screw 62 manually, friction disc 42 may be turned axially with relation to base 38 in very fine adjustments.

Mounted on the outer face of friction disc 42, concentrically therewith, is a circular turntable 64, said turntable being provided with an axial stub shaft 66 rotatably engaged in bearing bushing 40 of chuck base 38, whereby said turntable may be rotated relative to said base and said friction disc. An annular ring 68 is secured to the inner face of turntable 64, concentrically therewith, by screws 70, and extends within the hollow interior of friction disc 42. Said ring is provided with an outwardly facing peripheral shoulder 72 which confronts an inwardly facing peripheral shoulder 74 of friction disc 42. Between these shoulders is disposed a split brake ring 76 concentric with shaft 66. Said brake ring is trapezoidal in cross-sectional contour, being narrower at its outer periphery than at its inner periphery, and shoulders 72 and 74 are correspondingly bevelled, so that when said ring is expanded it engages said shoulders frictionally to lock turntable 64 against rotation relative to friction disc 42. Said brake ring is resilient, and normally biased to a retracted position so as to permit free rotation of the turntable, but may be expanded to its locking position by means of a tapered wedge 78 (see FIGS. 4 and 5). Said wedge is disposed between the split ends of brake ring 76, and is carried by a plunger 80 disposed radially of the ring and carried for axial sliding movement in a plug 82 threaded in friction ring 42. Said plunger is biased inwardly, whereby to urge wedge 78 to lock the turntable against rotation, by a spring 84 coiled thereabout, said spring bearing at one end against plug 82 and at its opposite end against a collar 86 fixed on said plunger. Pivoted on the outwardly extended end of the plunger, as at 88, is a cam 90 having a handle 92. When said handle is pivoted into general alignment with the plunger, the eccentric lobes 94 of the cam engage plug 82 and urge the plunger, and wedge 78, outwardly against spring 84, whereby brake ring 76 is allowed to contract to permit rotation of the turntable. The angular position of the turntable with respect to friction ring 42 is indicated by a scale 96 imprinted on the outer peripheral edge of the turntable, which may be read in relation to an index mark 98 on friction ring 42 (see FIG. 1). Chuck 8 is mounted on turntable 64 by any suitable means such as screws 100, so that the work-gripping axis thereof is coaxial with stub shaft 66.

In operation, the carrier base plates 20 of the two chucks at the opposite ends of the crankshaft are first turned so that the adjusting screws 26 thereof are exactly parallel. This may be done by suitable latch means, not shown, releasably securing said carrier base plates in fixed positions relative to the headstock and tailstock carried by frame 2. The end main bearings 14 of crankshaft 16 are then clamped tightly in the chucks. Then, after loosening set screws 34, screws 36 are turned to move chucks 8 radially to the spindles (spindle 6 only being shown), until the radial offset thereof equals the radial offset from main bearing 14 on the rod bearing 18 on which it is desired to operate. This may be done by reading a scale (not shown) imprinted on base plate 20 with respect to an index mark on carrier 24. Set screw 34 is then tightened. Handle 92 of cam 90 is then grasped and pivoted to a radial position, whereupon said cam urges plunger 80 outwardly against spring 84 to allow wedge 78 to release brake ring 76, as previously described, whereupon turntable 64 may be rotated freely with respect to friction disc 42. The turntable is turned until the radial axis of the rod bearing 18 on which it is desired to operate is parallel to screw 26, whereupon cam 90 is again pivoted to its inoperative position, and wedge 78 again expands brake ring 76 to lock turntable 64 against rotation. This adjustment, which may be gauged visually by reading turntable scale 96 against index mark 98, is only approximate, not being capable of the extreme accuracy required for this purpose. At this time, the coaxial relation of the rod bearing 18 on which it is desired to operate, relative to the axis of spindle 6, is checked, preferably by a dial gauge based on machine frame 2 and having a feeler finger slidably engaging the rod bearing. The crankshaft is then turned slowly by hand, by rotating spindle 6, whereupon any eccentricity of the rod bearing is indicated on the dial gauge, usually in thousandths of an inch. Any offset of the rod bearing in a direction parallel to screw 26, due to mis-adjustment of carrier 24 on carrier base plate 20, may then be corrected by loosening set screw 34 and turning screw 26 slightly, the correction being read directly on the dial gauge. Any offset of the rod bearing in a direction at right angles to screw 26 may be corrected by turning screw 62, which engages radial arm 52 of friction disc 42 to turn said friction disc relative to chuck base 38, the action of the screw against said arm being resisted at all times by spring 60. This adjustment, which may be very fine and delicate, may also be read directly on the dial gauges previously referred to.

Thus the entire operation of bringing any rod bearing of the crankshaft into coaxial relationship with the spindle axis may be carried out quickly, conveniently and accurately, and without the necessity of shifting said crankshaft relative to chuck jaws 10 at any time. In all prior related devices within my knowledge, particularly the fine rotary adjustment of the crankshaft, has been accomplished by partially loosening the chuck jaws and pounding or hammering on the crankshaft to rotate it minutely with respect to said jaws. This method is not only a difficult, tedious and highly skilled operation, but also sometimes results in scoring damage to the highly machined bearing surfaces engaged by the chuck jaws.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In combination with a machine spindle and a work-gripping chuck having a fixed work-gripping axis, mounting means attaching said chuck to said spindle, said mounting means comprising:
   (a) a carrier base affixed to said spindle and rotatable therewith,
   (b) a carrier mounted on said carrier base for movement thereon radially of the axis of said spindle,
   (c) means for moving said carrier adjustably on said carrier base,
   (d) a chuck base affixed to said carrier,
   (e) a friction disc mounted on said chuck base for limited rotation about an axis parallel to said spindle,
   (f) adjustable means for rotating said friction disc relative to said chuck base,
   (g) a turntable carried by said friction disc for free rotation, said chuck being affixed to said turntable with the work-gripping axis thereof coaxial with the axis of rotation of said turntable and said friction disc,
   (h) brake means interposed between said turntable and said friction disc and operable when engaged to lock said turntable and friction disc against relative rotation, and
   (i) manually operable means for selectively engaging and disengaging said brake means.

2. The combination as recited in claim 1 wherein said turntable is directly mounted for rotation on said chuck base independently of the connections of either of said former members to said friction disc.

3. The combination as recited in claim 1 wherein said adjustable means for rotating said friction disc relative to said chuck base comprises:
 (a) spring means biasing said friction disc rotationally in one direction relative to said chuck base, and
 (b) manually adjustable screw means operable to turn said friction disc rotationally in the opposite direction, against the pressure of said spring means.

4. The combination as recited in claim 1 wherein said adjustable means for rotating said friction disc relative to said chuck base comprises:
 (a) an arm affixed to said friction disc and extending therefrom radially to the axis thereof,
 (b) a bracket affixed to said chuck base and including a pair of bosses disposed at opposite sides of said arm in a plane at right angles to the rotational axis,
 (c) a compression spring carried by one of said bosses and engaging one side of said arm to urge said friction disc rotatively in one direction, and
 (d) a screw generally aligned with said spring but threaded in the other of said bosses and engaging the side of said arm opposite to that engaged by said spring.

5. The combination as recited in claim 1 wherein said brake means comprises:
 (a) a split resilient brake ring concentric with said friction disc and turntable and operable when expanded to frictionally engage cooperating shoulders of said turntable and friction disc to prevent relative rotation therebetween,
 (b) a wedge carried by said friction disc and disposed between the ends of said brake ring, being operable when urged in one direction to expand said brake ring,
 (c) a spring urging said wedge in the direction to expand said brake ring, and
 (d) manually operable cam means operable to retract said wedge against said spring.

References Cited by the Examiner
UNITED STATES PATENTS

| | | | |
|---|---|---|---|
| 1,056,476 | 3/13 | Wennerstrom | 279—6 |
| 2,128,625 | 8/38 | Vaughn | 279—6 |
| 2,429,685 | 10/47 | Healy. | |
| 2,733,560 | 2/56 | Strnad | 279—6 |

FRANK SUSKO, *Primary Examiner.*

ROBERT C. RIORDON, *Examiner.*